Feb. 1, 1966  S. HUNT  3,233,091
PORTABLE STAND-BY EMERGENCY LIGHT UNIT
Filed March 7, 1962  6 Sheets-Sheet 1
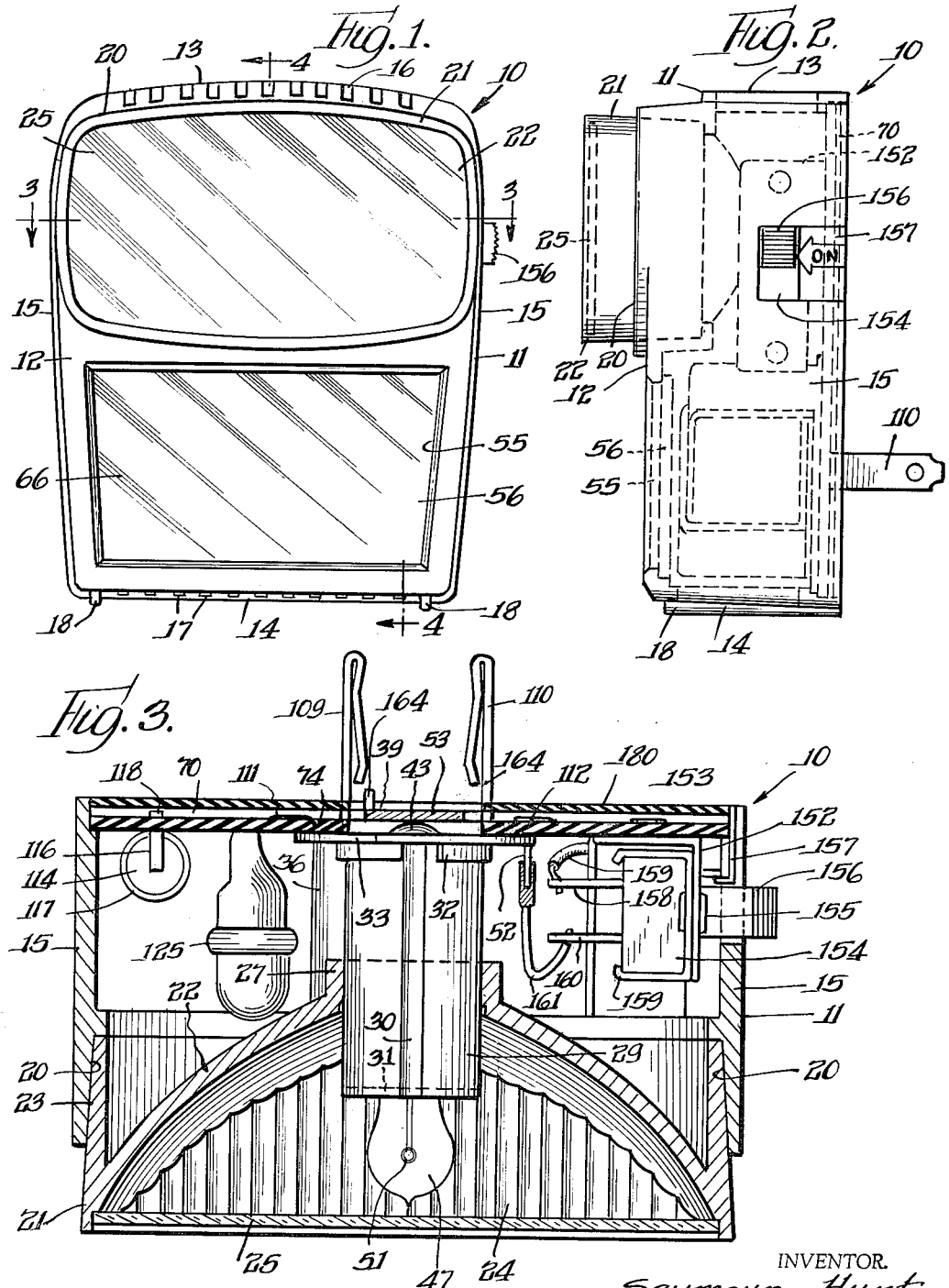
INVENTOR.
Seymour Hunt
BY
Wallenstein, Spangenberg
& Hattis
Attys.

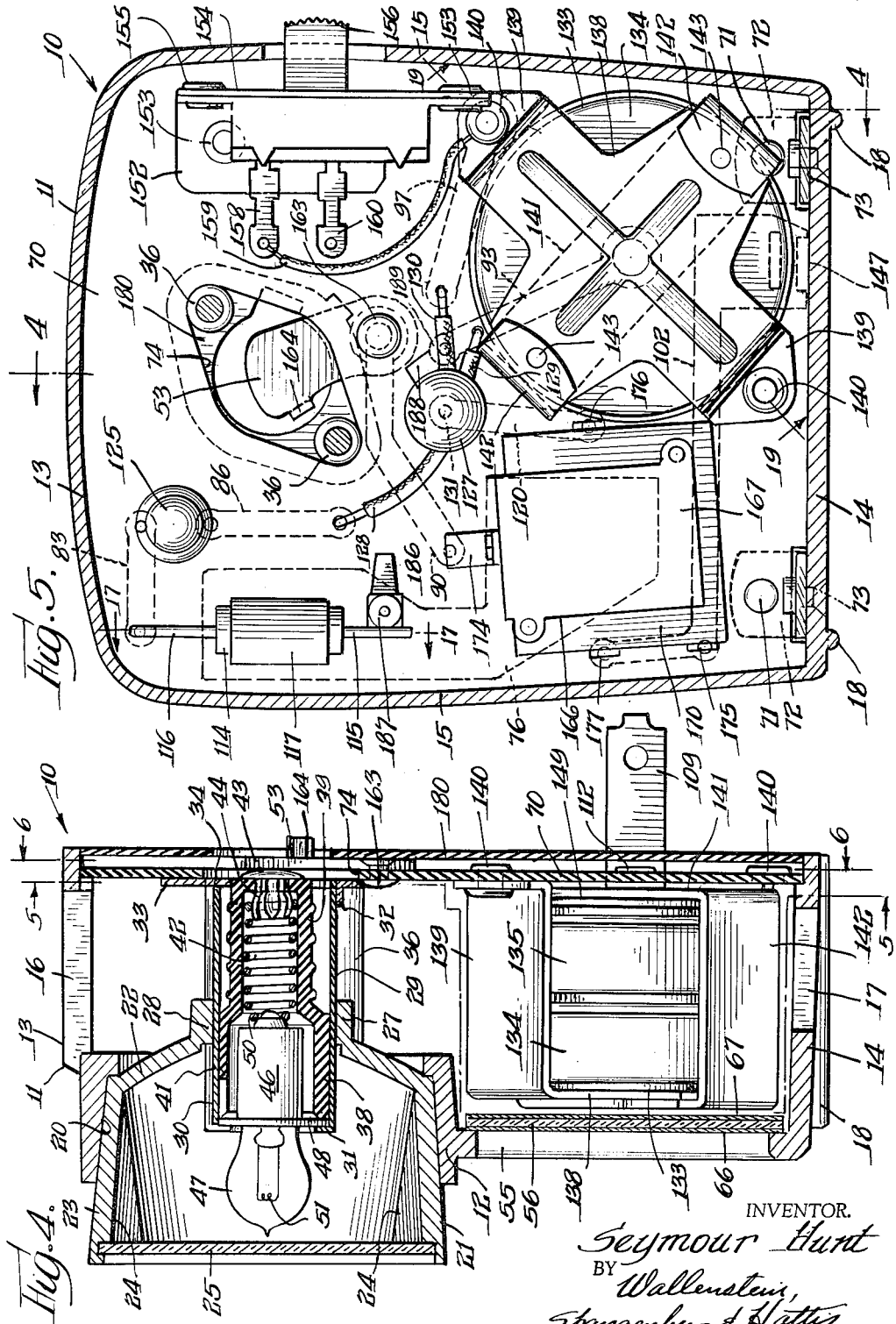

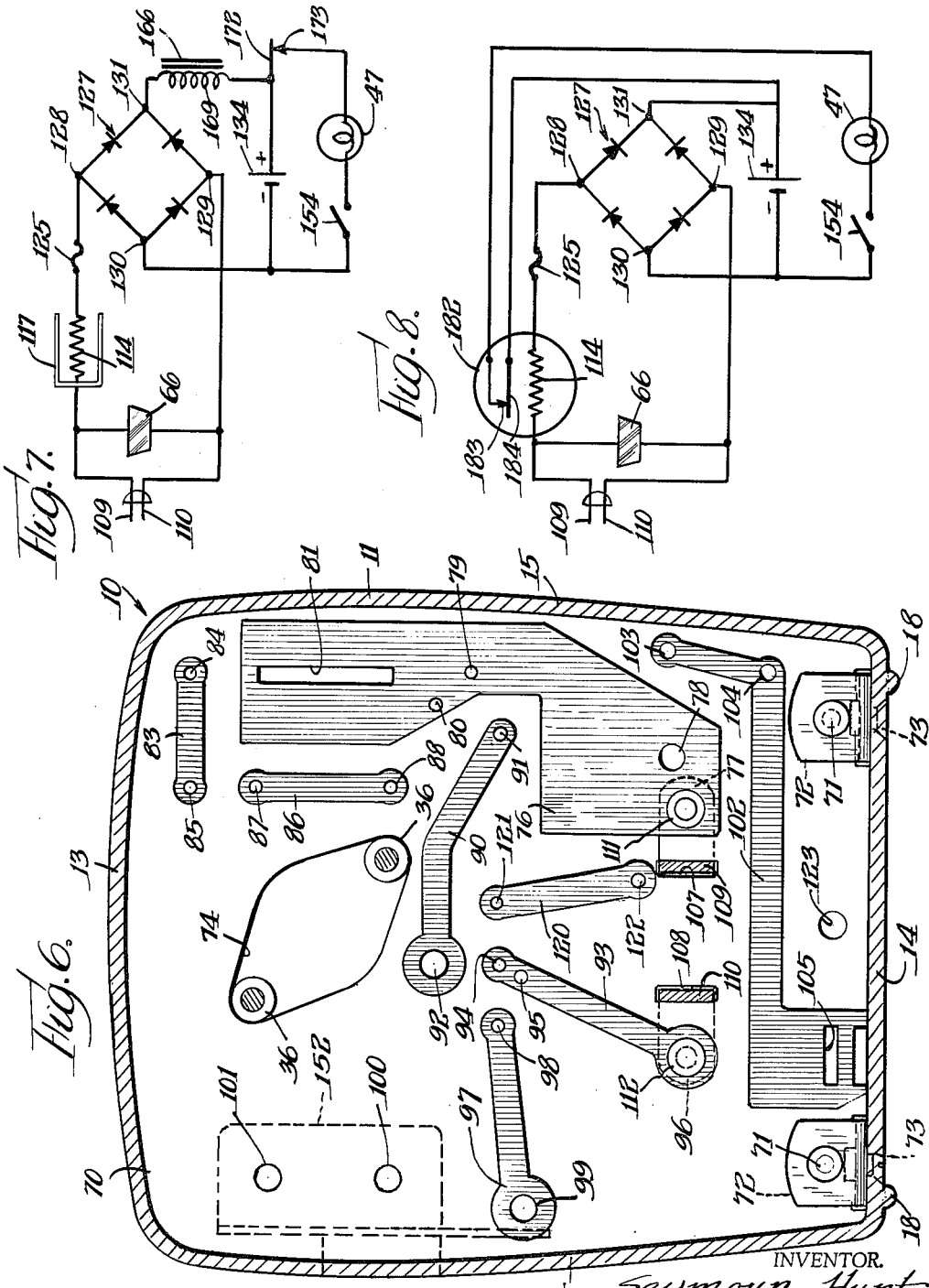

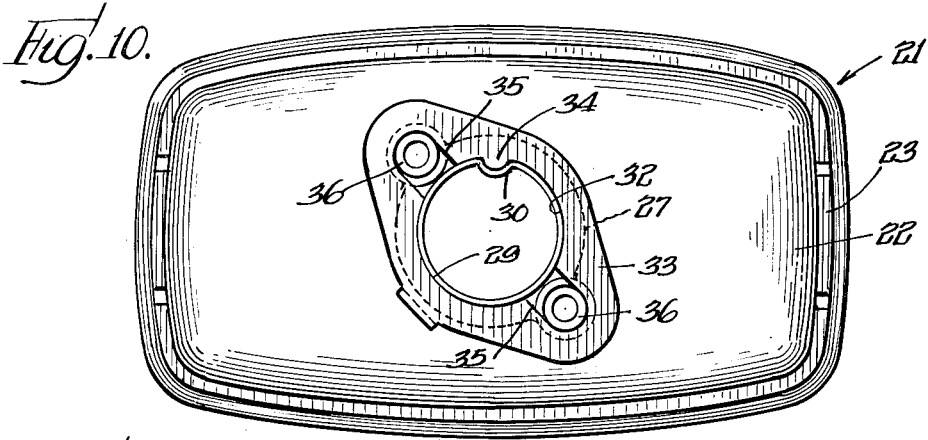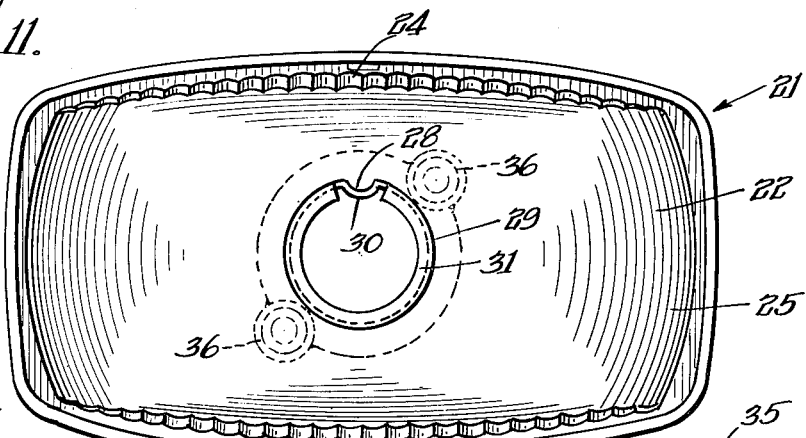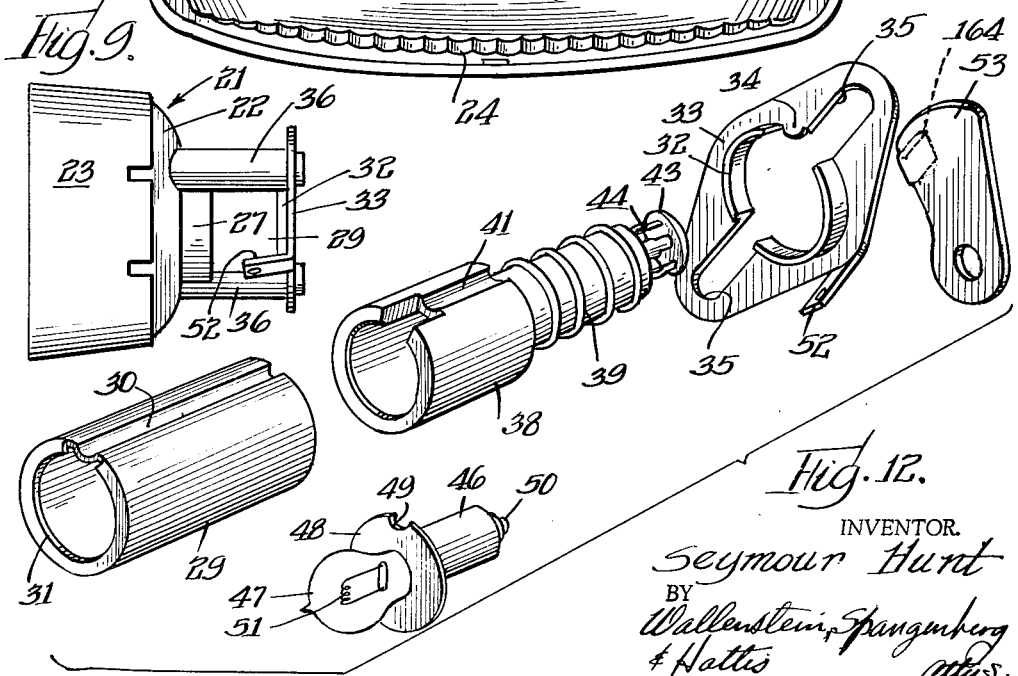

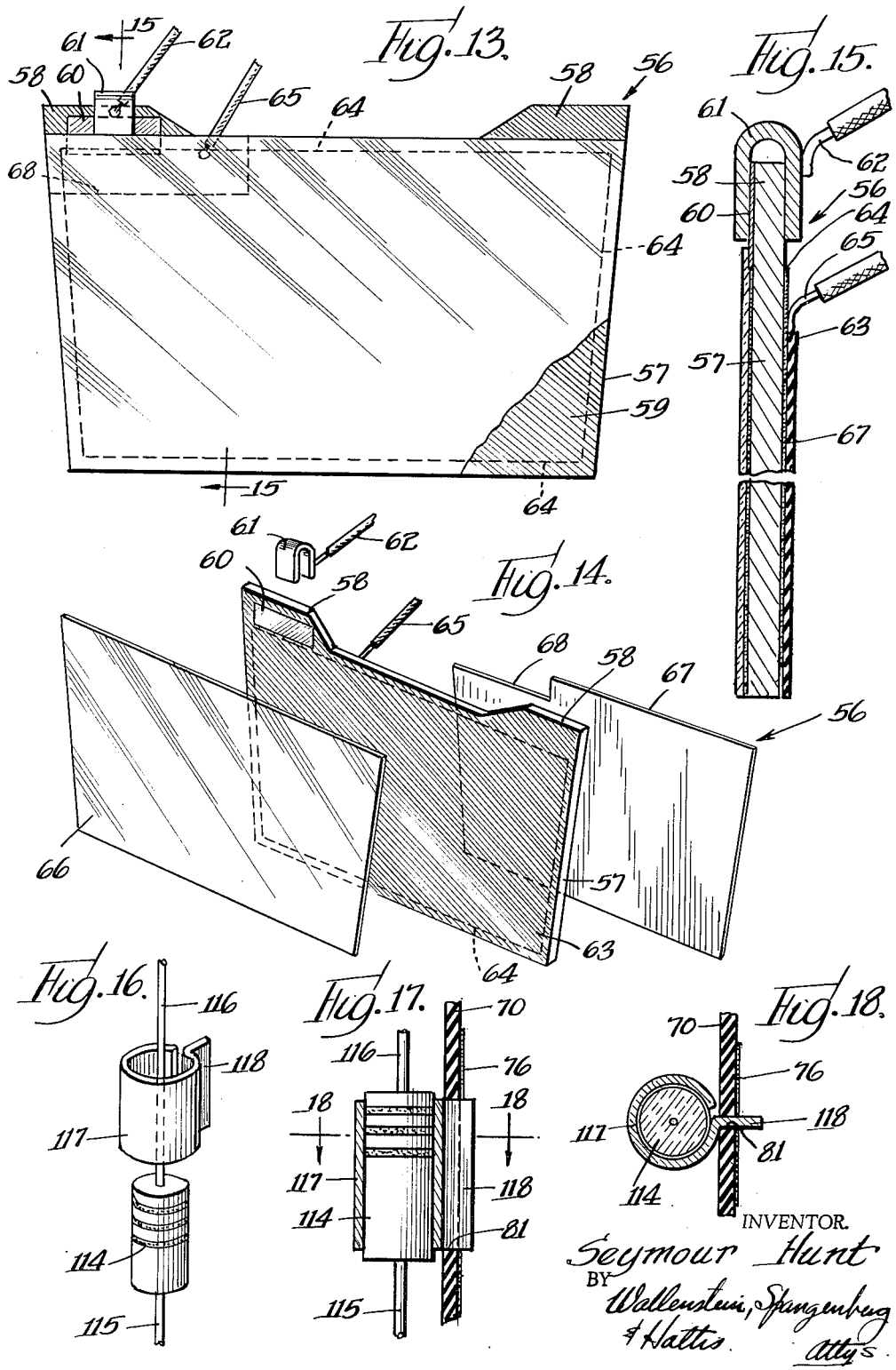

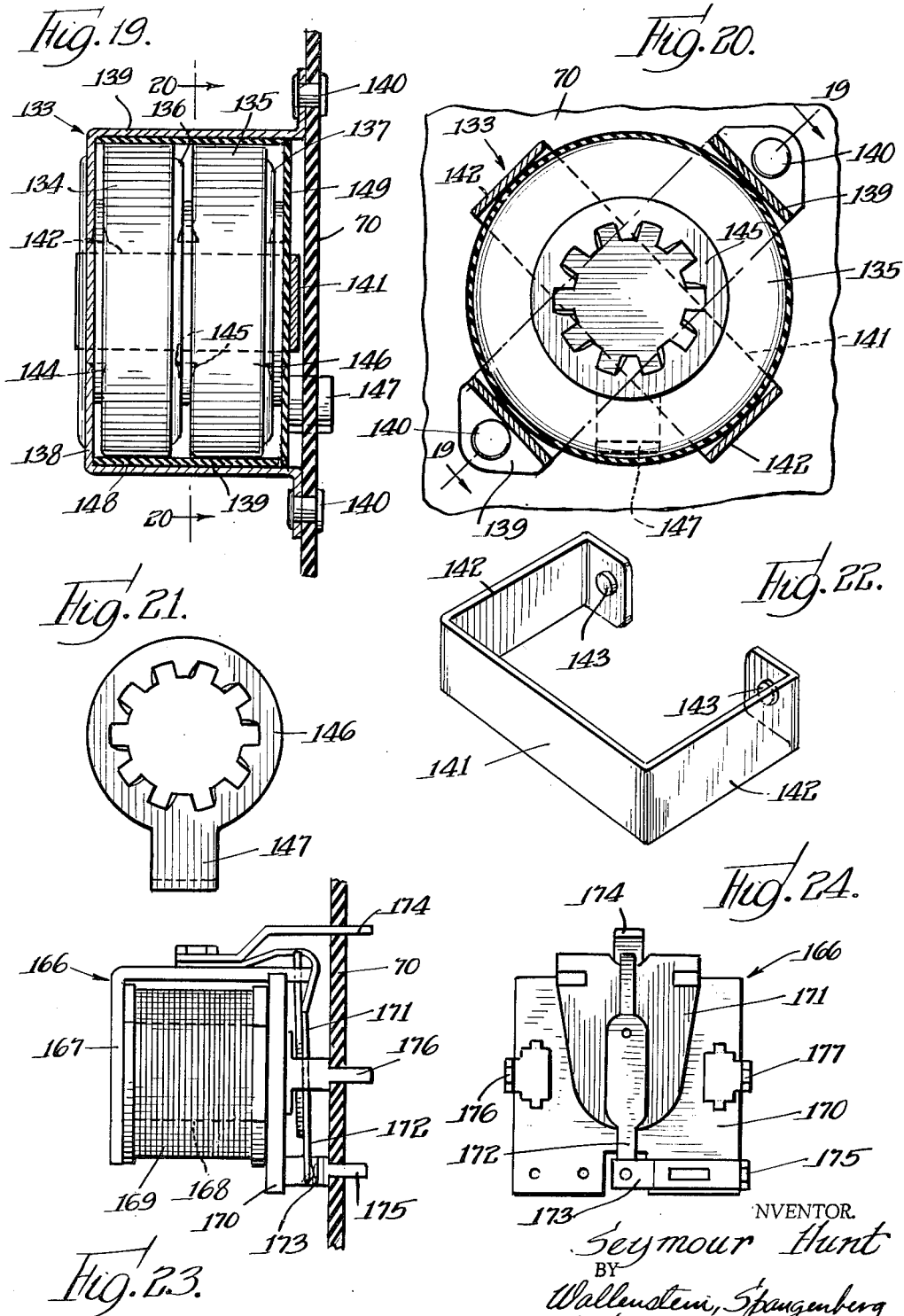

United States Patent Office 3,233,091
Patented Feb. 1, 1966

3,233,091
PORTABLE STAND-BY EMERGENCY LIGHT UNIT
Seymour Hunt, Chatham, N.J., assignor to Gulton Industries, Inc., Metuchen, N.J., a corporation of New Jersey
Filed Mar. 7, 1962, Ser. No. 178,101
8 Claims. (Cl. 240—10.6)

The principal object of this invention is to provide a portable stand-by emergency light unit which is adapted to be removably plugged into and supported by an A.C. electrical socket, such as a conventional wall socket, which contains a rechargeable battery chargeable through a dropping resistor and rectifier, which contains a D.C. lamp energized by the rechargeable battery and a control relay therefor, wherein the rechargeable battery is charged and the D.C. lamp is deenergized when the lighting unit is plugged into a live A.C. electrical socket, and wherein the D.C. lamp is energized from the rechargeable battery when a power failure occurs at the A.C. electrical socket or the light unit is removed from the A.C. electrical socket.

Thus, the light unit automatically provides stand-by projected light upon power failure and automatically performs the function of a flashlight when removed from the A.C. electrical socket. An on-off switch is also preferably utilized for deenergizing the lamp, when desired, this being particularly useful when the light unit is used as a flashlight. The light unit is also preferably provided with an A.C. electroluminescent panel which produces light at the light unit when the light unit is plugged into the live A.C. electrical socket, this A.C. electroluminescent panel providing a night light.

The light unit preferably includes a hollow housing having front, top, bottom and side walls and a panel secured to the rear of the hollow housing for enclosing the same. A lamp assembly including a lens, a reflector and said D.C. lamp for projecting light from the light unit is preferably arranged in an opening in the front wall of the housing, and also, the A.C. electroluminescent panel for producing light at the light unit is preferably arranged in another opening in the front wall of the light, so that both light sources are effective when the light unit is removably mounted at its rear in the A.C. electrical socket.

An A.C. electrical plug is carried by the rear panel and it has its prongs extending rearwardly therefrom for removable reception in the A.C. electrical socket for electrically energizing and supporting the light unit. The A.C. dropping resistor, the rectifier, the rechargeable battery, the control relay, and the on-off switch are all preferably carried by the rear panel within the housing, and the electrical connections between them and to the D.C. lamp and the A.C. electroluminescent panel preferably include printed circuits on the rear panel, thereby providing a simple, inexpensive and readily constructed subassembly.

In one form of this invention, the control relay is a D.C. electromagnetic relay having its operating coil in the connections between the rectifier and the rechargeable battery and its contacts in the connections between the rechargeable battery and the lamp or controlling energization of the lamp. By so utilizing a D.C. relay, the use of shading poles or damping rings is eliminated, costs are greatly reduced, energizing currents are low, and heat generation is kept at a minimum.

Also, in this form of the invention the A.C. dropping resistor is encompassed by a heat sink which in turn is conductively carried by a portion of the printed circuit which is conductively connected to one of the prongs of the A.C. electrical plug. This portion of the printed circuit has large mass and it, in conjunction with the heat sink, conducts and dissipates to the A.C. electrical socket much of the heat generated by the dropping resistor. In this way, much of the heat is kept out of the housing of the light unit and the dropping resistor may be of considerably less wattage rating than if this heat dissipating feature were not utilized.

In another form of this invention, the control relay is a thermal relay having its contacts in the connections between the rechargeable battery and the lamp and having its thermostatic element subject to the heat generated by the dropping resistor for controlling energization of the lamp. Thus, here, the dropping resistor performs two functions, that of dropping the A.C. voltage to the rectifier and that of operating the thermal relay. In both forms of the invention, the top and bottom walls of the hollow housing are provided with slots for affording circulation of air through the housing to dissipate heat generated therein.

Further objects of this invention reside in the details of construction of the portable stand-by emergency light unit and in the cooperative relationships between the component parts thereof.

Other objects and advantages of this invention will become apparent to those skilled in the art upon reference to the accompanying specification, claims and drawings in which:

FIG. 1 is a front elevational view of one form of the portable stand-by emergency light unit of this invention;

FIG. 2 is a side elevational view looking from the right of FIG. 1;

FIG. 3 is an enlarged horizontal sectional view taken substantially along the line 3—3 of FIG. 1;

FIG. 4 is a vertical sectional view taken substantially along the lines 4—4 of FIG. 1 and 4—4 of FIG. 5;

FIG. 5 is a vertical sectional view taken substantially along the line 5—5 of FIG. 4;

FIG. 6 is a vertical sectional view taken substantially along the line 6—6 of FIG. 4;

FIG. 7 is a wiring diagram of the portable stand-by emergency light unit of the form of the invention illustrated in FIGS. 1 to 6;

FIG. 8 is a wiring diagram of another form of the invention which utilizes a thermal relay in lieu of an electromagnetic relay;

FIG. 9 is a side elevational view of the lamp assembly of the light unit;

FIG. 10 is an enlarged rear elevational view of the lamp assembly;

FIG. 11 is an enlarged front elevational view of the lamp assembly;

FIG. 12 is an exploded perspective view of a portion of the lamp assembly;

FIG. 13 is a front elevation view of the electroluminescent panel utilized in the portable stand-by emergency light unit for providing a night light;

FIG. 14 is an exploded perspective view of the electroluminescent panel illustrated in FIG. 13;

FIG. 15 is an enlarged vertical sectional view of the electroluminescent panel taken substantially along the line 15—15 of FIG. 13;

FIG. 16 is an exploded perspective view of the dropping resistor and the heat sink therefor;

FIG. 17 is a vertical sectional view of the dropping resistor and the heat sink taken substantially along the line 17—17 of FIG. 5;

FIG. 18 is a horizontal sectional view of the dropping resistor and heat sink taken substantially along the line 18—18 of FIG. 17;

FIG. 19 is a sectional view through the rechargeable battery assembly taken substantially along the lines 19—19 of FIG. 5 and 19—19 of FIG. 20;

FIG. 20 is a vertical sectional view taken substantially along the line 20—20 of FIG. 19;

FIG. 21 is a plan view one of the battery contact elements utilized in the rechargeable battery assembly;

FIG. 22 is a perspective view of a strap utilized in the rechargeable battery assembly;

FIG. 23 is an elevational view of the electromagnetic relay utilized in the form of the portable stand-by emergency light illustrated in FIGS. 1 to 7;

FIG. 24 is another elevational view of the electromagnetic relay looking from the right of FIG. 23.

One form of the portable stand-by emergency light unit of this invention is generally designated at 10 in FIGS. 1 to 6. It includes a hollow housing 11 which is preferably molded from a suitable synthetic plastic material. The hollow housing 11 has a front wall 12, a top wall 13, a bottom wall 14 and side walls 15, the housing being open at its rear. The top wall of the housing is provided with a plurality of slots 16 therein and the bottom wall 14 is provided with a plurality of slots 17 therein, these slots 16 and 17 providing for circulation of air through the hollow housing for dissipation of heat generated therein. The bottom wall 14 is also provided with a pair of ribs 18 forming supporting feet for the light unit when not supported by the electrical socket and to elevate the bottom wall from the supporting surface.

The upper portion of the front wall 12 of the housing 11 is provided with an elongated opening 20 in which is received a lamp assembly 21, the contour of the lamp assembly 21 being such as to fit closely within the opening 20. The lamp assembly 21 includes a parabolic reflector portion 22 having fluted side surfaces 24 and is provided with a mounting portion 23 for mounting the same in the opening 20 in the housing. The reflector portion 22 with its fluted side surfaces 24 are enclosed by a lens 25. The lamp assembly corresponds to the lamp assembly disclosed in William Mack application, Serial No. 150,495, filed November 6, 1961, the reflector portion 22 and its side surfaces 24 being provided with an aluminized coating and operating to provide a spot of light and a uniform flood of light therearound. Thus, the lamp assembly operates to project desired light from the light unit.

The reflector portion 22 of the lamp assembly includes a rearwardly extending central flange 27 provided with a locating key 28. A metallic sleeve 29 is received within the flange 27 and it is provided with a key-way 30 which receives the key 28 for positioning the sleeve 29 in appropriate rotative position with respect to the reflector portion 22. The metallic sleeve 29 is electrically isolated from the aluminized coating on the reflector portion 22 so that the latter will not become "hot" to ground. The forward end of the metallic sleeve 29 is provided with an inturned flange 31, as shown in more detail in FIGS. 4 and 10 to 12. The rear end of the sleeve 29 is received in a flange 32 formed on a plate 33, the plate 33 having a key 34 cooperating with the key-way 30 for rotatively fixing the relative positions of the plate 33 and the sleeve 29. The plate 33 is also provided with a pair of radially extending slots 35 which receive posts 36 extending rearwardly from the reflector portion 22 of the lamp assembly 21. Thus, the posts 36, the plate 33 and the flange 27 operate to support the metallic sleeve 29 in appropriate position in the lamp assembly and in electrical contact with the plate 33.

A plug member 38, formed of suitable electrical insulating material, is removably received within the metallic sleeve 29, it having a reduced diameter rear portion 39 and a key-way 41 cooperating with the inner side of the key-way 30 for preventing rotation of the plug member 38 with respect to the sleeve 29. Thus, the plug member 38 may be slidably received within the sleeve 29 and with rotation of the plug member with respect to the sleeve being prevented. The plug member 38 is hollow and the reduced diameter rear portion 39 thereof receives a spring 42, the rear of the spring engaging fingers 44 on a snap member carried by the rear of the plug member and which is also provided with a contact button 43. Thus, the spring 42 is physically secured to the snap member and is electrically connected to the contact button 43.

A lamp having a base 46 and a bulb 47 is removably receivable in the larger diameter portion of the plug member 38. The base 46 is provided with a flange 48 having a notch 49 therein which cooperates with the inner side of the key-way 30 of the sleeve 29 for accurately rotatively positioning the lamp with respect to the sleeve. The base 46 and its flange 48 make electrical contact with one end of the filament 51 in the bulb 47, the other end of the filament making electrical contact with a center terminal 50 on the base 46. The center terminal 50 is contacted by the spring 42 which makes electrical contact with the terminal 50 and which urges the flange 48 of the lamp into physical and electrical contact with the inturned flange 31 of the sleeve 29.

In assembling the parts of the lamp assembly, the base 46 of the lamp is inserted in the plug member 38 and then the lamp and plug member are inserted into the sleeve 29 from the rear thereof. The spring 42 urges the flange 48 of the lamp into engagement with inturned flange 31 of the sleeve 29 and the parts are maintained in assembled position by a pivoted lever 53 engaging the contact button 43. An electrical circuit is completed through the lamp from the pivoted lever 53 to a terminal tab 52 formed on the plate 33. The filament of the lamp 51 is vertically arranged by the flange slot 44 so that it is broadside to the reflector surface 22 to provide maximum light output.

The lower portion of the front wall 12 of the housing 11 is provided with an opening 55, and arranged behind this opening 55 is an electroluminescent panel 56, one form of which is illustrated in more detail in FIGS. 4 and 13 to 15. Here, there is utilized a panel 57 formed of a suitable ceramic or synthetic plastic material having phosphor crystals embedded therein, the panel being provided with upwardly extending extensions 58. The front side of the panel 57 is provided with a thin electrically conducting transparent metallic film, such as a thin transparent film of silver, gold or the like applied thereto by vacuum plating or the like. The front side of the panel 57, at one of the extensions 58, thereof is provided with a conducting cement 60, such as a conducting epoxy resin or the like, so as to make electrical contact with the transparent electrically conducting film on the front side of the panel. Electrical connection is made to the conducting cement 60, and hence to the transparent metallic film 59, by a clip 61 soldered to the conducting cement 60 and to a lead wire 62. The rear of the panel 57 is provided with a thicker metallic conducting layer 63 which is maintained within the boundary designated at 64. Electrical connection is made to this conducting layer 63 by soldering a lead 65 thereto. Other forms of electroluminescent panels may be utilized within the purview of this invention, as for example, a laminate consisting of a special iron plate, a layer of glass frit or ceramic, a layer of phosphor of copper and zinc sulphur, a coating of tin oxide, and a coating of glass frit or ceramic, electrical connections being made to the iron plate and the tin oxide coating.

When an A.C. voltage is applied to the metallic film 59 and the metallic layer 63 through the leads 62 and 65, the phosphor crystals within the panel 57 luminesce so as to produce light thereat which is visible through the transparent conducting film 59. The front of the panel 57 is provided with a transparent window 66 for protecting the panel 57 and the rear of the panel 57 is provided with an electrical insulating sheet 67 which is notched at 68 to accommodate the clip 61 and the leads 62 and 65. The electroluminescent panel including the panel 57, window 66 and the insulating sheet 67 are suitably secured behind the opening 55 so that, when the panel 57 is energized with an A.C. voltage, the light produced thereby is transmitted through the transparent metallic film 59 and the transparent window 66 so as to be visible from the exterior of the housing.

The open rear of the hollow housing 11 is closed by a panel 70 formed of suitable electrical insulating material. The panel 70 is secured by rivets 71 to brackets 72 which in turn are secured by countersunk screws 73 to the bottom wall 14 of the hollow housing 11. The panel 70 is also provided with an opening 74 which receives the ends of the posts 36 of the lamp assembly for also holding the panel in place, the opening 74 also permitting removal of the plug 38 and lamp 46 from the rear of the housing.

The panel 70 has printed circuits applied to the rear surface thereof, these printed circuits being illustrated in more detail in FIG. 6. The printed circuits include a circuit portion 76 which encompasses holes 77, 78, 79 and 80 and a slot 81 extending through the panel, a circuit portion 83 encompassing holes 84 and 85 extending through the panel, a circuit portion 86 encompassing holes 87 and 88 extending through the panel, a circuit portion 90 encompassing holes 91 and 92 extending through the panel, a circuit portion 93 encompassing holes 94, 95 and 96 extending through the panel, a circuit portion 97 encompassing holes 98 and 99 extending through the panel, a circuit portion 102 encompassing holes 103 and 104 and a slot 105 extending through the panel, and a circuit portion 120 encompassing holes 121 and 122 extending through the panel. The panel 70 is also provided with holes 100, 101 and 123 therethrough which are not encompassed by the printed circuits. The printed circuits are applied to the rear face of the panel 70 in conventional fashion.

The panel 70 is also provided with a pair of slots 107 and 108 therein which receive rearwardly extending prongs 109 and 110 which form an A.C. electrical plug. The prongs 109 and 110 are secured in place on the panel 70 by rivets 111 and 112 extending through the holes 77 and 96, these rivets 77 also conductively electrically connecting the prongs 109 and 110 to the printed circuit portions 76 and 93 respectively. The prongs 109 and 110 are received in an A.C. electrical socket for energizing the same with A.C. current and for physically supporting the light unit 10 from the electrical socket.

Referring more particularly to FIGS. 3, 5, 6 and 16 to 18, a dropping resistor 114 has a lead 115 extending through the hole 79 in the printed circuit portion 76 and a lead 116 extending through the hole 84 in the printed circuit portion 83, these leads being soldered in conventional fashion to these printed circuit portions. The dropping resistor 114 is for the purpose of dropping the normal A.C. voltage to a suitable voltage for operating a rectifier which charges the cells of the battery assembly. The dropping resistor 114 is encompassed by a heat sink 117 having a tab 118 which extends through the slot 81 in the panel 70 and which is suitably soldered to the printed circuit portion 76. It is here noted that the printed circuit portion 76 is of considerable mass and the heat sink 117 and the printed circuit portion 76 operate to conduct heat from the dropping resistor 114 through the prong 109 of the electrical plug for dissipating the generated heat by conduction to the electrical receptacle. By so conducting the heat away from the dropping resistor 114 the wattage rating of the resistor may be considerably less than the wattage rating of a resistor not provided with such heat dissipation. For example, a one wattage resistor with the heat sink has an effective rating of a three wattage resistor and a two wattage resistor has a rating of a five wattage resistor. Thus, the heat sink for conducting the generated heat from the resistor, as aforesaid, decreases the amount of heat present in the housing and also provides a substantial reduction in resistor cost.

A fuse 125 carried by the panel 70 within the housing has its leads extending through the holes 85 and 87 and soldered to the printed circuit portions 83 and 86 to provide a fused electrical connection therebetween. A rectifier 127 having a plurality of rectifiers arranged in bridge configuration (as illustrated in FIG. 7) is also carried by the panel 70 within the housing. The rectifier 127 has a lead 128 extending through the hole 88 and soldered to the printed circuit portion 86, a lead 129 extending through the hole 95 and soldered to the printed circuit portion 93, a lead 130 extending through the hole 98 and soldered to the printed circuit portion 97, and a lead 131 extending through the hole 121 and soldered to the printed circuit portion 120. The rectifier 127 is thereby energized with A.C. current from the prongs 109 and 110 of the electrical plug for producing a D.C. current for charging a rechargeable battery when the alternating voltage is applied to the prongs.

The rechargeable battery assembly is generally designated at 133 and it is shown in more detail in FIGS. 4, 5 and 19 to 22. The rechargeable battery assembly includes two cells or batteries 134 and 135, these cells or batteries being metallically encased and preferably being of the nickel-cadmium type. The metallic encasing forms one of the terminals of the batteries and the batteries or cells 134 and 135 are also provided on one face with metallic terminals 136 and 137. The batteries or cells 134 and 135 are carried by a bracket 138 having a pair of depending legs 139 which are secured to the panel 70 by rivets 140 extending through the holes 99 and 123 in the panel. The rivet 140, which extends through the hole 99, electrically connects the bracket 138 to the printed circuit portion 97. The assembly also includes a strap 141 for holding the batteries or cells 134 and 135 in the bracket 138, the strap 141 having arms 142 which are provided with punched lugs 143 which are in turn removably received in holes in the bracket 138. Thus, the cells 134 and 135 are removably secured in place between the strap 141 and the bracket 138.

Electrical contact is established between the bracket 138 and the cell 134 by a lock washer 144 interposed therebetween, the twisted internal finger portions of the lock washer digging into and making positive electrical contact therewith. Another lock washer 145 with twisted internal finger portions is interposed between the battery or cell 135 and the terminal 136 of the battery or cell 134 so as to established electrical connection therebetween. A further lock washer 146 with twisted internal finger portions electrically contacts the terminal 137 of the battery or cell 135 and it is provided with a tab 147 which extends rearwardly through the slot 105 in the panel 70 and is soldered to the printed circuit portion 102. This washer 146 is insulated from the strap 141 by an insulating disc 149 and the battery or cells 134 and 135 are marginally insulated from the legs of the strap 141 and the bracket 138 by a cylindrical insulating sleeve 148. The rechargeable battery, therefore, includes the two cells or batteries 134 and 135 electrically connected in series, the cell 134 being electrically connected to the printed circuit portion 97 and the terminal 137 of the cell 135 being electrically connected to the printed circuit portion 102.

Also secured to the panel 70 within the housing is a switch mounting bracket 152, this bracket being held in place by rivets 153 extending through the holes 100 and 101 in the panel. An on-off switch 154 is secured to the bracket 152 by rivets 155, the switch 154 having an actuator 156 extending outwardly from the side wall 15 of the housing through an opening therein so as to be manually manipulated from the exterior of the housing. The housing also carries an indicator plate 157 adjacent to the actuator 156 for indicating the on and off position of the switch 154. One terminal 158 of the switch 154 is electrically connected to the printed circuit portion 97 by a lead extending from the terminal 158 to the battery clamping rivet 140. The other terminal 160 of the on-off switch 154 is connected by a lead 161 to the terminal tab 152 on the plate 33 of the lamp assembly, as shown more clearly in FIG. 3.

The pivoted lever 53, which holds the lamp 46 in place through the spring 42 and which makes electrical contact with the contact button 43, is pivoted to the panel 70 by a rivet 163 which extends through the hole 92 in the panel. The pivoted lever 53 and hence the center terminal 50 of the lamp 46 make electrical contact with the printed circuit portion 90. The pivoted lever 53 is also provided with a rearwardly extending ear 164 by which the lever is pivoted to provide access to the lamp assembly for changing the lamp thereof through the rear of the light unit.

A D.C. electromagnetic relay, generally designated at 166 and shown in more detail in FIGS. 23 and 24, is also carried by the panel 70 within the housing. This relay 166 includes a frame 167 carrying a core 168 about which is arranged an operating coil or winding 169. The relay also includes a terminal block 170 carried by the frame 167. An armature 171 is pivotally carried by the frame 167 and it carries a contact 172 which normally engages a contact 173. When the relay coil 169 is energized with D.C. current, the armature 171 is attracted to separate the the contact 172 from the contact 173, and when the relay coil is deenergized, the armature 171 is released to engage the contacts 172 and 173. The contact carried by the armature 171 is electrically connected to a terminal 174 and the contact 173 is provided with a terminal 175, both terminals being carried by the terminal block 170. The terminal block 170 also carries terminals 176 and 177 which are electrically connected to the ends of the winding or coil 169. The relay 166 is mounted on the panel 70 by means of the terminals thereof, the terminal 174 extending through the hole 91, the terminal 175 extending through the hole 104, the terminal 176 extending through the hole 122 and the terminal 177 extending through the hole 103. The terminals 175 and 177 are soldered to and electrically connected to the printed circuit portion 102, the terminal 174 is soldered to an electrically connected to the printed circuit portion 90 and the terminal 176 is soldered to and electrically connected to the printed circuit portion 120.

The leads 62 and 65 from the electroluminescent panel 56 are connected to terminal clips 186 and 188 (FIG. 5), the terminal clip 186 being attached to the panel 70 and electrically connected to the printed circuit portion 76 by a rivet 187 extending through the hole 80, and the terminal clip 188 being secured to the panel 70 and electrically connected to the printed circuit portion 93 by a rivet 189 extending through the hole 94. In this way, the electroluminescent panel 56 is electrically connected to the prongs 107 and 108 of the electrical plug.

The rear face of the printed circuit panel 70 is covered with a cover panel 180 formed of suitable electrical insulating material, this cover panel 180 being suitably held in place and being provided with openings therethrough for accommodating the prongs 109 and 110 of the electrical plug and with an opening to allow passage of the plug member 38 of the light assembly therethrough.

The electrical connections between the various parts of the portable stand-by emergency light unit of this form of the invention are diagrammatic illustrated in FIG. 7, like reference characters being utilized for like parts. When the prongs 109 and 110 of the electrical plug are inserted in a live electrical socket, an A.C. voltage is produced across the prongs. The electroluminescent panel 66 is coupled to these prongs 109 and 110 so that it will produce light so long as the A.C. voltage is present. This electroluminescent panel 66 operates as a night light. Also, A.C. current is conducted from the prongs 109 and 110 through the dropping resistor 114 to the rectifier 127 for energizing the same and which, in turn, produces a D.C. voltage for charging the rechargeable battery 134. The relay coil 169 is included in the D.C. circuit from the rectifier 127 to the battery 134 so that it is energized while the battery 134 is being charged. As a result, the movable contact 172 of the relay 166 disengages the contact 173 so as to break the D.C. circuit from the rechargeable battery 134 to the lamp 47. Thus, while the battery 134 is being charged, the lamp 47 is deenergized. When a power failure exists at the electrical socket or when the light unit is removed from the electrical socket, the rectifier 127 is deenergized and charging of the battery 134 is stopped. As a result, the relay 169 drops out and the movable contact 172 engages the stationary contact 173 to complete a D.C. circuit from the rechargeable battery 134 to the lamp 47 for projecting light therefrom. Thus, the lamp 47 is automatically energized upon a power failure so as to provide a stand-by emergency light and, also, to provide a flashlight when the light unit is removed from the electrical socket. The on-off switch 154 is provided for interrupting the circuit through the lamp 147 when it is desired to have light from the lamp extinguished.

Referring now to FIG. 8, there is shown a wiring diagram of another form of this invention. The two forms of the invention differ in the kind of relay utilized for controlling the energization of the lamp 47. Otherwise, the two forms of the invention are the same, and like reference characters have been utilized for like parts. In lieu of the D.C. electromagnetic relay 166, the form of the invention illustrated in FIG. 8 utilizes a thermal relay 182. The thermal relay 182 includes a dropping resistor 114 which corresponds to the aforementioned dropping resistor and a stationary contact 183 engageable by a thermostatic element 184 for completing a circuit to the lamp 47. Heating of the dropping resistor 114 causes the thermostatic element 184 to separate from the contact 183 and, accordingly, while the rechargeable battery 134 is being charged, the thermostatic element 184 is separated from the contact 183 to open the circuit to the lamp 47. When, however, energization of the rectifier 137 is stopped, due to a power failure or to removal of the light unit from the electrical socket, the thermostatic element 184 cools off to engage the contact 183 and complete the circuit from the battery 134 through the lamp 147 for illuminating the same. Here, the single resistor 114 operates as the dropping resistor for the rectifier 127 and also as the heater for the thermostatic element 184.

While for purposes of illustration two forms of this invention have been disclosed, other forms thereof may become apparent to those skilled in the art upon reference to this disclosure and, therefore, this invention is to be limited only by the scope of the appended claims.

I claim as my invention:

1. A combination night light and portable stand-by emergency light unit comprising an electrical plug removably receivable in an electrical socket for removably supporting the light unit therefrom and for energizing the electrical plug with A.C. current, an electroluminescent panel for producing light at the light unit, conductor means connecting the electroluminescent panel to the electrical plug for energizing the electroluminescent panel with A.C. voltage when the electrical plug is energized with A.C. current to provide a night light, a rectifier, a resistor, conductor means connecting the rectifier and the resistor in series with the electrical plug for producing a D.C. voltage at the rectifier when the electrical plug is energized with A.C. current, a rechargeable battery, conductor means connecting the rectifier to the rechargeable battery for charging the same with D.C. current when the electrical plug is energized with A.C. current, a lamp for projecting light from the light unit, conductor means connecting the rechargeable battery with the lamp for energizing the lamp with D.C. current, relay contacts in said last mentioned conductor means for opening and closing the same, and relay means responsive to energization of the electrical plug operating the relay contacts for opening said last mentioned conductor means to deenergize the lamp when the electrical plug is energized and for closing said last mentioned conductor means to energize the lamp when the electrical plug is deenergized by an A.C. power failure at the electrical socket or by removal of the electrical plug from the electrical socket.

2. A combination night light and portable stand-by emergency light unit comprising an electrical plug removably receivable in an electrical socket for removably supporting the light unit therefrom and for energizing the electrical plug with A.C. current, an electroluminescent panel for producing light at the light unit, conductor means connecting the electroluminescent panel to the electrical plug for energizing the electroluminescent panel with A.C. voltage when the electrical plug is energized with A.C. current to provide a night light, a rectifier, a resistor, conductor means connecting the rectifier and the resistor in series with the electrical plug for producing a D.C. voltage at the rectifier when the electrical plug is energized with A.C. current, a rechargeable battery, conductor means connecting the rectifier to the rechargeable battery for charging the same with D.C. current when the electrical plug is energized with A.C. current, a lamp for projecting light from the light unit, conductor means connecting the rechargeable battery with the lamp for energizing the lamp with D.C. current, relay contacts in said last mentioned conductor means for opening and closing the same, and relay means responsive to energization of the electrical plug operating the relay contacts for opening said last mentioned conductor means to deenergize the lamp when the electrical plug is energized and for closing said last mentioned conductor means to energize the lamp when the electrical plug is deenergized by an A.C. power failure at the electrical socket or by removal of the electrical plug from the electrical socket, and a manually operated on-off switch connected in said last mentioned conductor means for closing and opening the same to permit energization of the lamp by the relay contacts in its on position and to prevent energization of the lamp by the relay contacts in its off position.

3. A portable stand-by emergency light unit comprising an electrical plug removably receivable in an electrical socket for removably supporting the light unit therefrom and for energizing the electrical plug with A.C. current, a rectifier, a dropping resistor, conductor means connecting the rectifier and the dropping resistor in series with the electrical plug for producing a D.C. voltage at the rectifier when the electrical plug is energized with A.C. current, a rechargeable battery, conductor means connecting the rectifier to the rechargeable battery for charging the same with D.C. current when the electrical plug is energized with A.C. current, a lamp for projecting light from the light unit, conductor means connecting the rechargeable battery with the lamp for energizing the lamp with D.C. current, and a thermal relay including normally closed relay contacts in the conductor means from the battery to the lamp for closing and opening the same, and a contact operating thermostatic element heated by said dropping resistor in the conductor means from the electrical plug to the rectifier to open the relay contacts for deenergizing the lamp when the electrical plug is energized and to close the relay contacts for energizing the lamp when the electrical plug is deenergized by an A.C. power failure or by removal of the electrical plug from the electrical socket.

4. A portable stand-by emergency light unit comprising a hollow housing having front, top, bottom and side walls, a panel secured to the rear of the hollow housing and enclosing the same, an electrical plug carried by the panel and having its prongs extending rearwardly and removably receivable in an electrical socket for removably supporting the light unit therefrom and for energizing the electrical plug with A.C. current, a rectifier carried by the panel within the housing, a resistor carried by the panel within the housing, conductor means connecting the rectifier and the resistor in series with the electrical plug for producing a D.C. voltage at the rectifier when the electrical plug is energized with A.C. current, a rechargeable battery carried by the panel within the housing, conductor means connecting the rectifier with the rechargeable battery for charging the same with D.C. current when the electrical plug is energized with A.C. current, a light assembly carried in an opening in the front wall of the hollow housing and including a lens, reflector and lamp for projecting light from the light unit, conductor means connecting the rechargeable battery with the lamp for energizing the lamp with D.C. current, a relay carried by the panel within the housing and including relay contacts in said last mentioned conductor means for closing and opening the same, and contact operating means responsive to energization of the electrical plug to open the relay contacts for deenergizing the lamp when the electrical plug is energized and to close the relay contacts for energizing the lamp when the electrical plug is deenergized by an A.C. power failure or by removal of the electrical plug from the electrical socket.

5. A combination night light and portable stand-by emergency light comprising a hollow housing having front, top, bottom and side walls, a panel secured to the rear of the hollow housing and enclosing the same, an electrical plug carried by the panel and having its prongs extending rearwardly and removably receivable in an electrical socket for removably supporting the light unit therefrom and for energizing the electrical plug with A.C. current, an electroluminescent panel carried in an opening in the front wall of the hollow housing for producing light at the light unit, conductor means connecting the electroluminescent panel to the electrical plug for energizing the electroluminescent panel with A.C. voltage when the electrical plug is energized with A.C. current to provide a night light, a rectifier carried by the panel within the housing, a resistor carried by the panel within the housing, conductor means connecting the rectifier and the resistor in series with the electrical plug for producing a D.C. voltage at the rectifier when the electrical plug is energized with A.C. current, a rechargeable battery carried by the panel within the housing, conductor means connecting the rectifier with the rechargeable battery for charging the same with D.C. current when the electrical plug is energized with A.C. current, a light assembly carried in an opening in the front wall of the hollow housing and including a lens, reflector and lamp for projecting light from the light unit, conductor means connecting the rechargeable battery with the lamp for energizing the lamp with D.C. current, a relay carried by the panel within the housing and including relay contacts in said last mentioned conductor means for closing and opening the same, and contact operating means responsive to energization of the electrical plug to open the relay contacts for deenergizing the lamp when the electrical plug is energized and to close the relay contacts for energizing the lamp when the electrical plug is deenergized by an A.C. power failure or by removal of the electrical plug from the electrical socket.

6. A combination night light and portable stand-by emergency light comprising a hollow housing having front, top, bottom and side walls, a panel provided with printed circuits thereon and secured to the rear of the housing and enclosing the same, an electrical plug carried by the panel and having its prongs extending rearwardly and removably receivable in an electrical socket for removably supporting the light unit therefrom and for energizing the electrical plug with A.C. current, an electroluminescent panel carried in an opening in the front wall of the housing for producing light at the light unit, conductor means including a portion of said printed circuits connecting the electroluminescent panel to the electrical plug for energizing the electroluminescent panel with A.C voltage when the electrical plug is energized with A.C. current to provide a night light, a rectifier carried by the panel within the housing, a resistor carried by the panel within the housing, conductor means including a portion of said printed circuits connecting the rectifier and the resistor in series with the electrical plug for producing a D.C. voltage at the rectifier when the electrical plug is energized with A.C. current, a rechargeable battery carried by the panel within the housing, conductor means including a portion of said printed circuits connecting the rectifier with the rechargeable battery for charging the same with D.C. current when the electrical plug is energized with A.C. current, a light assembly carried in an opening in the front wall of the hollow housing and including a lens, reflector and lamp for projecting light from the light unit, conductor means including a portion of said printed circuits connecting the rechargeable battery with the lamp for energizing the lamp with D.C. current, a relay carried by the panel within the housing and including relay contacts in said last mentioned conductor means for closing and opening the same, and contact operating means responsive to energization of the electrical plug to open the relay contacts for deenergizing the lamp when the electrical plug is energized and to close the relay contacts for energizing the lamp when the electrical plug is deenergized by an A.C. power failure or by removal of the electrical plug from the electrical socket.

7. A combination night light and portable stand-by light unit comprising an electrical plug removably receivable in an electrical socket for removably supporting the light unit therefrom and for energizing the electrical plug with A.C. current, an A.C. electroluminescent panel for producing light at the light unit, an A.C. dropping resistor, a rectifier for producing a D.C. current, a rechargeable battery, a D.C. lamp for projecting light from the light unit, a control relay for the lamp, and conductor means interconnecting the electrical plug, the electroluminescent panel, the dropping resistor, the rectifier, the rechargeable battery, the lamp and the control relay for energizing from the electrical plug the electroluminescent panel and the rectifier through the dropping resistor to illuminate the electroluminescent panel and charge the battery and for deenergizing the lamp when the electrical plug is energized, and for deenergizing the electroluminescent panel and the rectifier and for energizing the lamp from the battery to illuminate the lamp when the electrical plug is deenergized by an A.C. power failure at the electrical socket or by removal of the electrical plug from the electrical socket.

8. A combination night light and portable stand-by light unit comprising a hollow housing having front, top, bottom and side walls, a panel secured to the rear of the hollow housing and enclosing the same, an electrical plug carried by the panel and having its prongs extending rearwardly and removably receivable in an electrical socket for removably supporting the light unit therefrom and for energizing the electrical plug with A.C. current, an A.C. electroluminescent panel carried in an opening in the front wall of the hollow housing for producing light at the light unit, an A.C. dropping resistor carried by the panel within the housing, a rectifier carried by the panel within the housing for producing a D.C. current, a rechargeable battery carried by the panel within the housing, a light assembly carried in an opening in the front wall of the hollow housing and including a lens, reflector and D.C. lamp for projecting light from the light units, a control relay for the lamp carried by the panel within the housing, and conductor means interconnecting the electrical plug, the electroluminescent panel, the dropping resistor, the rectifier, the rechargeable battery, the lamp and the control relay for energizing from the electrical plug the electroluminescent panel and the rectifier through the dropping resistor to illuminate the electroluminescent panel and charge the battery and for deenergizing the lamp when the electrical plug is energized, and for deenergizing the electroluminescent panel and the rectifier and for energizing the lamp from the battery to illuminate the lamp when the electrical plug is deenergized by an A.C. power failure at the electrical socket or by removal of the electrical plug from the electrical socket.

References Cited by the Examiner
UNITED STATES PATENTS

| | | | |
|---|---|---|---|
| 1,700,226 | 1/1929 | House | 240—37.1 |
| 1,964,201 | 6/1934 | Harsted | 240—10.6 |
| 2,437,516 | 3/1948 | Greppin | 240—41.38 |
| 2,597,073 | 5/1952 | Cunningham | 240—10.6 |
| 2,750,490 | 6/1956 | McGoldrick | 240—37.1 |
| 2,836,710 | 5/1958 | Paul | 240—2 |
| 2,876,410 | 3/1959 | Fry | 240—10.6 |
| 2,964,621 | 12/1960 | Foltyn | 165—185 X |
| 2,980,889 | 4/1961 | Meissner | 240—10.6 |
| 3,019,701 | 2/1962 | Breuckner et al. | 240—47 X |
| 3,061,716 | 10/1962 | Benander | 240—73 |

NORTON ANSHER, *Primary Examiner.*